US012566289B2

(12) United States Patent
    Hsu et al.

(10) Patent No.: US 12,566,289 B2
(45) Date of Patent: Mar. 3, 2026

(54) BACKLIGHT DEVICE AND DISPLAY DEVICE

(71) Applicant: InnoLux Corporation, Miao-Li County (TW)

(72) Inventors: Wei-Tsung Hsu, Miao-Li County (TW); Chi Fang, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/742,060

(22) Filed: Jun. 13, 2024

(65) Prior Publication Data
     US 2025/0020854 A1     Jan. 16, 2025

(30) Foreign Application Priority Data

Jul. 13, 2023    (CN) .......................... 202310858334.1

(51) Int. Cl.
     *F21V 8/00*                (2006.01)
(52) U.S. Cl.
     CPC ......... *G02B 6/0053* (2013.01); *G02B 6/0068* (2013.01)
(58) Field of Classification Search
     CPC .............................. G02B 6/0053; G02B 6/0068
     USPC ......................................................... 362/607
     See application file for complete search history.

(56) References Cited

U.S. PATENT DOCUMENTS

2015/0168632 A1*   6/2015   Yasuhara ............. G02B 6/0051
                                                            362/606
2021/0397041 A1*  12/2021   Kashiwagi ........ G02F 1/133607

FOREIGN PATENT DOCUMENTS

TW            202043881  A     12/2020

* cited by examiner

*Primary Examiner* — James R Greece
*Assistant Examiner* — Hana S Featherly
(74) *Attorney, Agent, or Firm* — MUNCY, GEISSLER, OLDS & LOWE, P.C.

(57) ABSTRACT

A backlight device includes a substrate, a light emitting component, a first optical film, a second optical film and a third optical film. The light emitting component is disposed on the substrate. The first optical film is disposed on the substrate, and includes a first prism structure extending along a first direction. The second optical film is disposed on the first optical film, and includes a second prism structure extending along a second direction. The third optical film is disposed on the second optical film, and includes a third prism structure extending along a third direction. An included angle between the first direction and the second direction is substantially between 30 degrees and 150 degrees, and the second direction is substantially parallel to the third direction.

19 Claims, 5 Drawing Sheets

BACKLIGHT DEVICE AND DISPLAY DEVICE

CROSS-REFERENCE TO RELATED APPLICATIONS

This application claims the benefits of the Chinese Patent Application Serial Number 202310858334.1, filed on Jul. 13, 2023, the subject matter of which is incorporated herein by reference.

BACKGROUND

Field of the Disclosure

The present disclosure relates to improvements in the backlight devices of the display device.

Description of Related Art

Nowadays, the electronic device with a relatively concentrated light source is obtained mostly by attaching a privacy film to the electronic devices to achieve the privacy effect. However, the above method still has shortcomings such as high energy consumption, high cost or low yield. In addition, the existing electronic devices are still unable to achieve both high contrast and low side lobe, or suffer from poor light package stability (that is, a low tolerance for assembly errors of the optical film).

Therefore, there is a need to provide an improved display device and backlight device to alleviate and/or obviate the aforementioned problems.

SUMMARY

The present disclosure provides a backlight device, which comprises: a substrate; a light emitting component disposed on the substrate for providing a light source; a first optical film disposed on the substrate and provided with a first prism structure extending along a first direction; a second optical film disposed on the first optical film and provided with a second prism structure extending along a second direction; and a third optical film disposed on the second optical film and provided with a third prism structure extending along a third direction, wherein an included angle between the first direction and the second direction is between 30 degrees and 150 degrees, and the second direction is parallel to the third direction.

The present disclosure further provides a display device, which comprises a backlight device including: a substrate; a light emitting component disposed on the substrate for providing a light source; a first optical film disposed on the substrate and provided with a first prism structure extending along a first direction; a second optical film disposed on the first optical film and provided with a second prism structure extending along a second direction; and a third optical film disposed on the second optical film and provided with a third prism structure extending along a third direction, wherein an included angle between the first direction and the second direction is between 30 degrees and 150 degrees, and the second direction is parallel to the third direction; and a display panel disposed on the backlight device.

Other novel features of the disclosure will become more apparent from the following detailed description when taken in conjunction with the accompanying drawings.

DETAILED DESCRIPTION OF EMBODIMENT

Figures 1A, 1B:
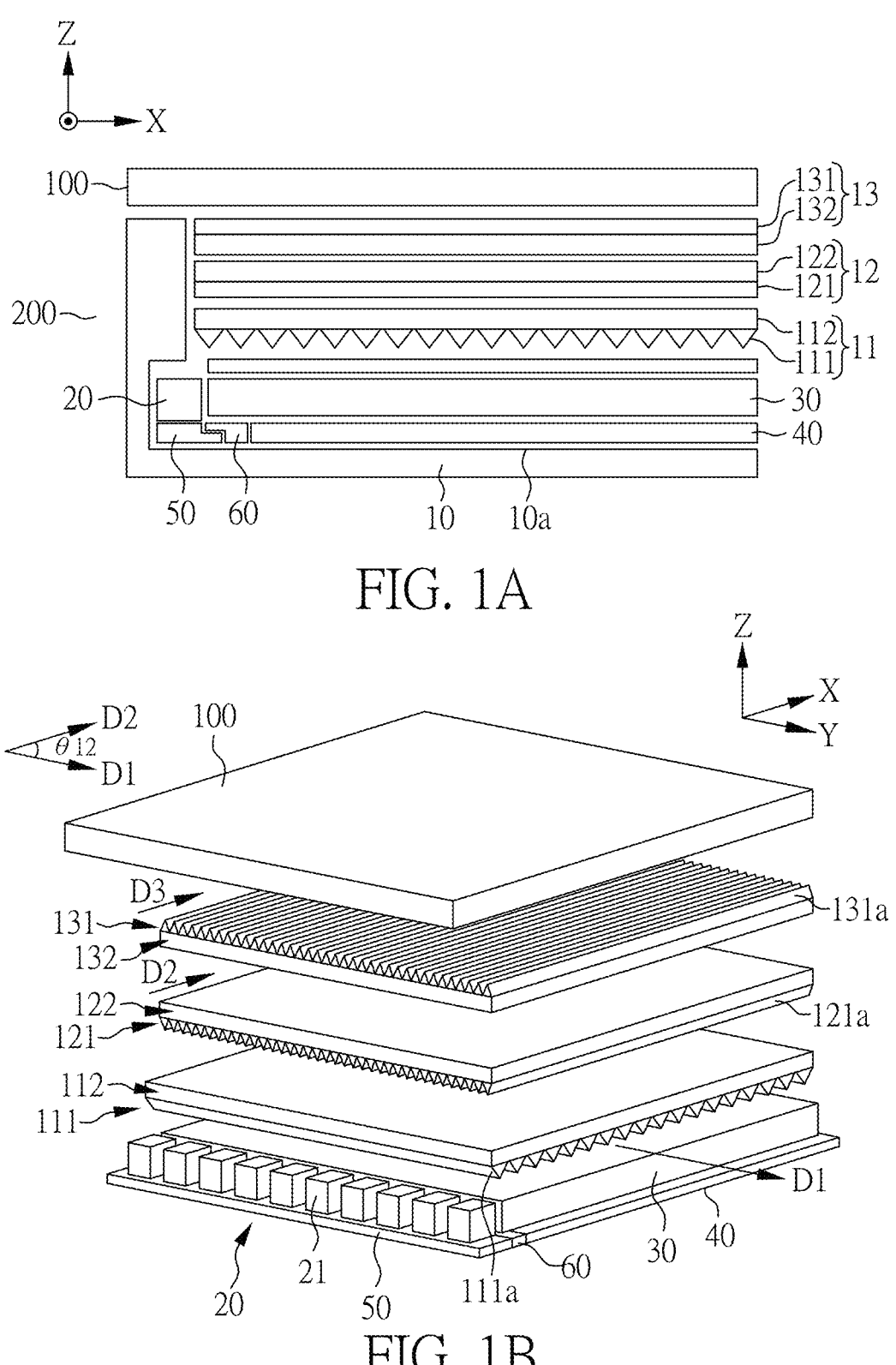
FIG. 1A is a schematic cross-sectional view of a display device according to an embodiment of the present disclosure.
FIG. 1B is a perspective view of a display device according to an embodiment of the present disclosure.

Reference will now be made in detail to exemplary embodiments of the present disclosure, examples of which are illustrated in the accompanying drawings. Wherever possible, the same reference numerals are used in the drawings and description to refer to the same or like parts.

Throughout the specification and the appended claims, certain terms may be used to refer to specific components. Those skilled in the art will understand that electronic device manufacturers may refer to the same components by different names. The present disclosure does not intend to distinguish between components that have the same function but have different names. In the following description and claims, words such as "comprising", "containing" and "having" are open-ended words, and should be interpreted as meaning "including but not limited to".

Directional terms mentioned in the specification, such as "up", "down", "front", "rear", "left", "right", etc., only refer to the directions of the drawings. Accordingly, the directional term used is illustrative, not limiting, of the present disclosure. In the drawings, various figures illustrate the general characteristics of methods, structures and/or materials used in particular embodiments. However, these drawings should not be construed to define or limit the scope or nature encompassed by these embodiments. For example, the relative sizes, thicknesses and positions of various layers, regions and/or structures may be reduced or enlarged for clarity.

One structure (or layer, component, substrate) described in the present disclosure is disposed on/above another structure (or layer, component, substrate), which can mean that the two structures are adjacent and directly connected, or can refer to two structures that are adjacent rather than directly connected. Indirect connection means that there is at least one intermediate structure (or intermediate layer, intermediate component, intermediate substrate, intermediate space) between the two structures, the lower surface of one structure is adjacent to or directly connected to the upper surface of the intermediate structure, and the upper surface of the other structure is adjacent to or directly connected to the lower surface of the intermediate structure. The intermediate structure may be a single-layer or multi-layer physical structure or a non-physical structure, which is not limited. In the present disclosure, when a certain structure is arranged "on" other structures, it may mean that a certain structure is "directly" on other structures, or it means that a certain structure is "indirectly" on other structures; that is, at least one structure is sandwiched, in between a certain structure and other structures. Terms related to joining and connecting, such as "connected" and "interconnected", unless otherwise specified, may refer to two structures that are in direct contact, or may also refer to two structures that are not in direct contact, and there are other structures provided between the two structures.

The terms, such as "about", "substantially" or "approximately", are generally interpreted as within 10% of a given value or range, or as within 5%, 3%, 2%, 1%, or 0.5% of a given value or range.

Furthermore, any two values or directions used for comparison may have certain errors. If the first direction is perpendicular or "substantially" perpendicular to the second direction, the angle between the first direction and the second direction may be between 80 degrees and 100 degrees. If the first direction is parallel or "substantially" parallel to the second direction, the angle between the first direction and the second direction may be between 0 degrees and 10 degrees.

In the specification and claims, unless otherwise specified, ordinal numbers, such as "first" and "second", used herein are intended to distinguish elements rather than disclose explicitly or implicitly that names of the elements bear the wording of the ordinal numbers. The ordinal numbers do not imply what order an element and another element are in terms of space, time or steps of a manufacturing method. Thus, what is referred to as a "first element" in the specification may be referred to as a "second element" in the claims.

In the present disclosure, the term "a given range is from a first value to a second value" or "a given range is within a range from the first value to the second value" means that the given range includes the first value, the second value and other values between the first value and the second value.

It should be understood that, according to the disclosed embodiments, an optical microscope (OM), a scanning electron microscope (SEM), a film thickness profiler ($\alpha$-step), an ellipsometer thickness gauge, or other suitable means may be used to measure the depth, thickness, width or height of each component, or the spacing or distance between components. According to some embodiments, a scanning electron microscope may be used to obtain a cross-sectional structure image including the components to be measured, and measure the depth, thickness, width or height of each component, or the spacing or distance between components.

In addition, the display device disclosed in the present disclosure may be used in an electronic device, and the electronic device may include imaging device, assembling device, display device, backlight device, antenna device, sensing device, tiled device, touch display device, curved display device or free shape display device, but not limited thereto. When the electronic device is an assembling device or a tiled device, the electronic device may include a grabbing mechanism, but not limited thereto. The electronic device may include, for example, liquid crystal, light emitting diode, fluorescence, phosphor, other suitable display media, or a combination thereof, but not limited thereto. The display device may be a non-self-luminous display device or a self-luminous display device. The antenna device may be a liquid crystal type antenna device or a non-liquid crystal type antenna device, and the sensing device may be a sensing device for sensing capacitance, light, thermal energy or ultrasonic waves, but not limited thereto. The tiled device may be, for example, a display tiled device or an antenna tiled device, but not limited thereto. It should be noted that the electronic device may be any permutation and combination of the aforementioned, but not limited thereto. In addition, the electronic device may be a bendable or flexible electronic device. It should be noted that the electronic device may be any permutation and combination of the aforementioned, but not limited thereto. In addition, the shape of the electronic device may be rectangular, circular, polygonal, with curved edges, or other suitable shapes. The electronic device may have peripheral systems such as a drive system, a control system, a light source system, a shelf system, etc. to support a display device, an antenna device or a tiled device.

It should be noted that the following embodiments may be replaced, reorganized, and mixed to complete other embodiments without departing from the spirit of the present disclosure. As long as the features of the various embodiments do not violate the spirit of the invention or conflict with each other, they can be mixed and matched arbitrarily.

Unless otherwise defined, all terms (including technical and scientific terms) used herein have the same meaning as commonly understood by those skilled in the art related to the present disclosure. It can be understood that these terms, such as those defined in commonly used dictionaries, should be interpreted as having meaning consistent with the relevant technology and the background or context of the present disclosure, and should not be interpreted in an idealized or excessively formal way. Unless there is a special definition in the embodiment of the present disclosure.

In addition, the term "adjacent" used herein may refer to describe mutual proximity and does not necessarily mean mutual contact.

In addition, the description of "when . . . " or "while . . . " in the present disclosure means "now, before, or after", etc., and is not limited to occurrence at the same time. In the present disclosure, the similar description of "disposed on" or the like refers to the corresponding positional relationship between the two components, and does not limit whether there is contact between the two components, unless specifically limited. Furthermore, when the present disclosure recites multiple effects, if the word "or" is used between the effects, it means that the effects can exist independently, but it does not exclude that multiple effects can exist at the same time.

FIG. 1A is a schematic cross-sectional view of a display device according to an embodiment of the present disclosure. FIG. 1B is a perspective view of a display device according to an embodiment of the present disclosure. It is noted that, in FIG. 1B, some components (substrate 10) in FIG. 1A are removed to make the features of other components more obvious. In addition, the relative relationships such as "top", "bottom", "above" or "below" of components in the following refer to the relative position in the Z direction. In addition, it is noted that the description of "one object is disposed on another object" in this article may mean that the object is disposed at a certain orientation of another object, but does not mean that the object is necessarily disposed above another object.

As shown in FIGS. 1A and 1B, the display device 1 of the present disclosure may include a display panel 100 and a backlight device 200, and the display panel 100 may be disposed on the backlight device 200. The backlight device 200 may include a substrate 10, a light emitting component 20, a first optical film 11, a second optical film 12 and a third optical film 13. In the normal direction of the substrate 10 (for example, Z direction), the light emitting component 20 is disposed on the substrate 10, the first optical film 11 is disposed on the substrate 10, the second optical film 12 is disposed on the first optical film 11, and the third optical film 13 is disposed on the second optical film 12.

The light emitting component 20 is used to provide a light source. The light emitting component 20 may include at least one light emitting sub-unit 21. For convenience of explanation, in the following, an example is given in which the light emitting component 20 includes a plurality of light emitting sub-units 21, and the plurality of light emitting sub-units 21 may be arranged along the Y direction, where the Y direction is perpendicular to the Z direction. The first optical film 11 includes a first prism structure 111, wherein the first prism structure 111 extends along a first direction D1, and the first direction D1 may be parallel to the Y direction or may be substantially parallel to the Y direction. The second optical film 12 includes a second prism structure 121, wherein the second prism structure 121 extends along a second direction D2. The third optical film 13 includes a third prism structure 131, wherein the third prism structure 131 extends along a third direction D3. In more detail, the first strip structure 111 may include a plurality of first strip structures 111a, and each first prism structure 111a extends in the direction D1. The second bar structure 121 includes a plurality of second prism structures 121a, and each second prism structure 121a extends in the second direction D2. The third prism structure 131 includes a plurality of third prism structures 131a, and each third prism structure 131a extends in the third direction D3. The first direction D1, the second direction D2 and the third direction D3 may each be perpendicular to the Z direction, but not limited thereto. In addition, the first direction D1, the second direction D2 and the third direction D3 may be disposed on the same horizontal plane (such as the XY plane), but not limited thereto.

In one embodiment, there may be an included angle $\theta12$ between the first direction D1 and the second direction D2 (as shown in FIG. 1B). In one embodiment, the included angle $\theta12$ may be approximately between plus/minus 30 degrees and 90 degrees, that is, the included angle $\theta12$ may be between 30 degrees and 150 degrees (that is, $30° \leq \theta12 \leq 150°$, while it is not limited thereto. In one embodiment, the included angle $\theta12$ may be approximately between plus/minus 45 degrees and 90 degrees, that is, the included angle $\theta12$ may be between 45 degrees and 150 degrees (that is, $45° \leq \theta12 \leq 150°$, while it is not limited thereto. In one embodiment, the included angle $\theta12$ may be approximately between plus/minus 60 degrees to 90 degrees, that is, the included angle $\theta12$ may be between 60 degrees and 120 degrees (that is, $60° \leq \theta12 \leq 120°$, while it is not limited thereto. Furthermore, in one embodiment, the second direction D2 and the third direction D3 may be substantially parallel.

In one embodiment, in the normal direction (Z) of the substrate 10, the tip portions (for example, the narrower end) of the first prism structure 111 and the second prism structure 121 may face the same direction; for example, the first prism structure 111 and the second prism structure 121 may face the substrate 10, but it is not limited thereto. The third prism structure 131 and the second prism structure 121 may face opposite directions; for example, the third prism structure 131 may face the display panel 100, but it is not limited thereto. In more detail, the first prism structure 111 may have a first bottom plate 112, and a first strip structure 111a is disposed on the first bottom plate 112. The second prism structure 121 may have a second bottom plate 122, and a second strip structure 121a is disposed on the second bottom plate 122. The third frame structure 131 may have a third bottom plate 132, and a third strip structure 131a is disposed on the third bottom plate 132. Here, "the first prism structure 111 faces the substrate 10" means that the first strip structure 111a is closer to the substrate 10 than the first bottom plate 112, "the second prism structure 121 faces the substrate 10" means that the second strip structure 121a is closer to the substrate 10 than the second bottom plate 122, and "the third prism structure 131 faces the display panel 100" means that the third strip structure 131a is closer to the display panel 100 than the third bottom plate 132.

Through the configuration of the first prism structure 111, the second prism structure 121, and the third prism structure 131, the display device 1 of the present disclosure may provide a high contrast effect. Alternatively, the light emitted by the backlight device 200 may be concentrated toward the front viewing angle without the need to additionally attach or arrange a privacy film or without using a collimated backlight module with low yield and/or high cost, thereby meeting privacy requirements or reducing side lobe.

Next, the characteristics of each component will be described.

First, the display panel 100 will be described. In the present disclosure, although it is not shown in detail in the figures, the display panel 100 may include an upper substrate, a lower substrate, a display unit, a seal member, an alignment film, a polarizing plate, a light shielding layer, a color filter layer and/or a driving device, but it is not limited thereto.

Next, the substrate 10 of the backlight device 200 will be described. The substrate 10 may be, for example, a base plate, a frame or a casing, and may have conductive or insulating properties, but it is not limited thereto. In one embodiment, the substrate 10 may be, for example, a frame or a casing including iron parts, but it is not limited thereto. In one embodiment, when the substrate 10 is a frame or a casing, the substrate 10 may also have a side part, and the side part may extend along the normal direction (Z) to be adjacent to the light emitting component 20, and the first optical film 11, the second optical film 12 and the third optical film 13, but it is not limited thereto. In one embodiment, the substrate 10 may include a plane 10a, and the light emitting component 20, the first optical film 11, the second optical film 12 and the third optical film 13 may be directly or indirectly disposed on the plane 10a. For example, in one embodiment, the backlight device 200 may also include a circuit board 50 (such as but not limited to a flexible circuit board), wherein the circuit board 50 may be disposed on the plane 10a, and the light emitting component 20 may be disposed on the circuit board 50, but it is not limited thereto. In one embodiment, a glue material 60 (which may be various types of glue materials) may be disposed between the light emitting component 20 and the substrate 10, but it is not limited thereto.

Next, the light emitting component 20 of the backlight device 200 will be described. In one embodiment, the type of the light emitting sub-unit 21 of the light emitting component 20 may include a light emitting diode. The light emitting diode may include, for example, an organic light emitting diode (OLED), a sub-millimeter light emitting diode (mini LED), micro LED or quantum dot LED (which may include QLED, QDLED), fluorescence, phosphor or other suitable materials, or a combination thereof, but it is not limited thereto.

Next, the first optical film 11, the second optical film 12 and the third optical film 13 of the backlight device 200 will be described. In one embodiment, the first optical film 11 and the second optical film 12 are in contact with each other, and the second optical film 12 and the third optical film 13 are in contact with each other. In another embodiment, the first optical film 11 and the second optical film 12 are in contact with each other and the second optical film 12 and the third optical film 13 are not in contact, or the first optical film 11 and the second optical film 12 are not in contact and the second optical film 12 and the third optical film 13 are in contact with each other. In one embodiment, when the first optical film 11 and the second optical film 12 are not in contact, a glue material may be disposed between the first optical film 11 and the second optical film 12, or when the second optical film 12 is not in contact with the third optical film 13, a glue material may be disposed between the second optical film 12 and the third optical film 13. The glue material here may be, for example, optical glue, but it may also be of other types of glue material.

In one embodiment, the backlight device 200 further includes a light guide component 30 disposed adjacent to the light emitting component 20. The light guide component 30 may be disposed on the substrate 10 in the normal direction (Z) of the substrate 10. In one embodiment, the light emitting component 20 may be disposed on one side of the light incident surface of the light guide component 30. In one embodiment, the light guide component 30 may be, for example, a light guide plate, but it is not limited thereto.

In one embodiment, the backlight device 200 further includes a reflective component 40. In the normal direction (Z) of the substrate 10, the reflective component 40 may be disposed between the substrate 10 and the light guide component 30. In one embodiment, the reflective component 40 may be used to reflect light emitted from the bottom of the light guide component 30 so that the light travels toward the display panel 100 to improve light utilization. In one embodiment, the material of the reflective component 40 is not particularly limited, and may include, but not limited to, metal, white ink, other reflective materials, or a combination thereof. The metal may include gold, silver, copper, aluminum or a combination thereof, but it is not limited thereto. The white ink may include white polyimide, resin or a combination thereof, but it is not limited thereto. In addition, the reflective component 40 may include a single-layer or multi-layer reflective film, while the present disclosure is not limited thereto. In one embodiment, the circuit board 50 and the reflective component 40 may be connected together through the glue material 60, but it is not limited thereto.

Next, the detailed structures of the first optical film 11, the second optical film 12 and the third optical film 13 of the present disclosure will be described with reference to FIGS. 2A to 4B, as well as FIGS. 1A and 1B.

Figures 2A, 2B:
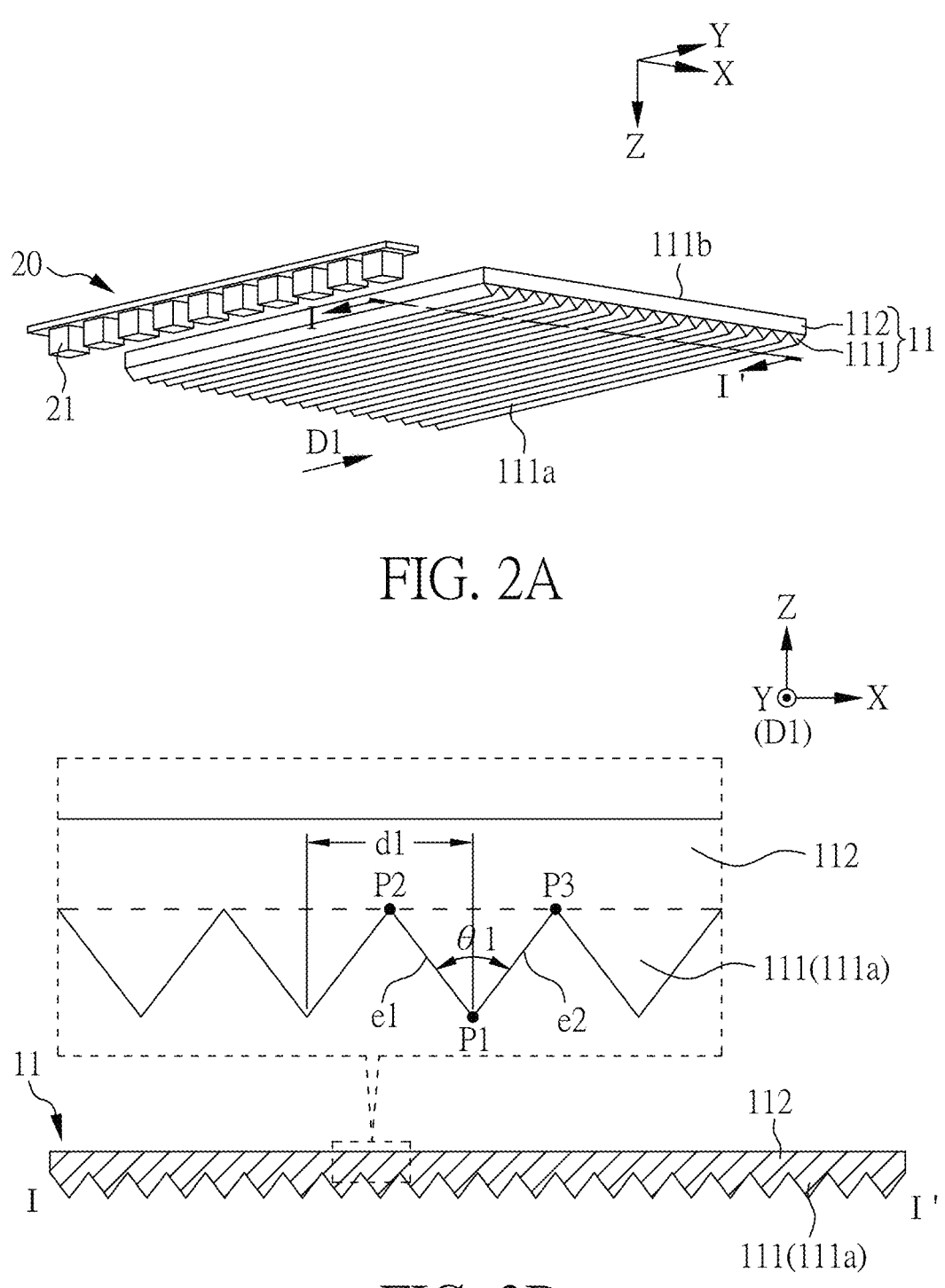
FIG. 2A is a schematic three-dimensional view of the first optical film according to an embodiment of the present disclosure.
FIG. 2B is a cross-sectional view of the first optical film of FIG. 2A taken along line II-II'.
Figure 3A:
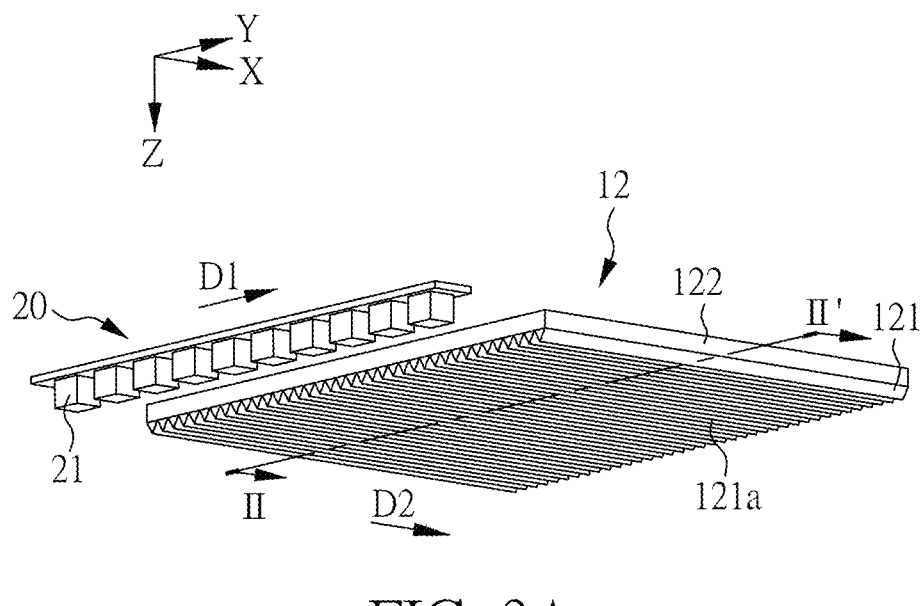
FIG. 3A is a schematic three-dimensional view of a second optical film according to an embodiment of the present disclosure.
Figure 3B:
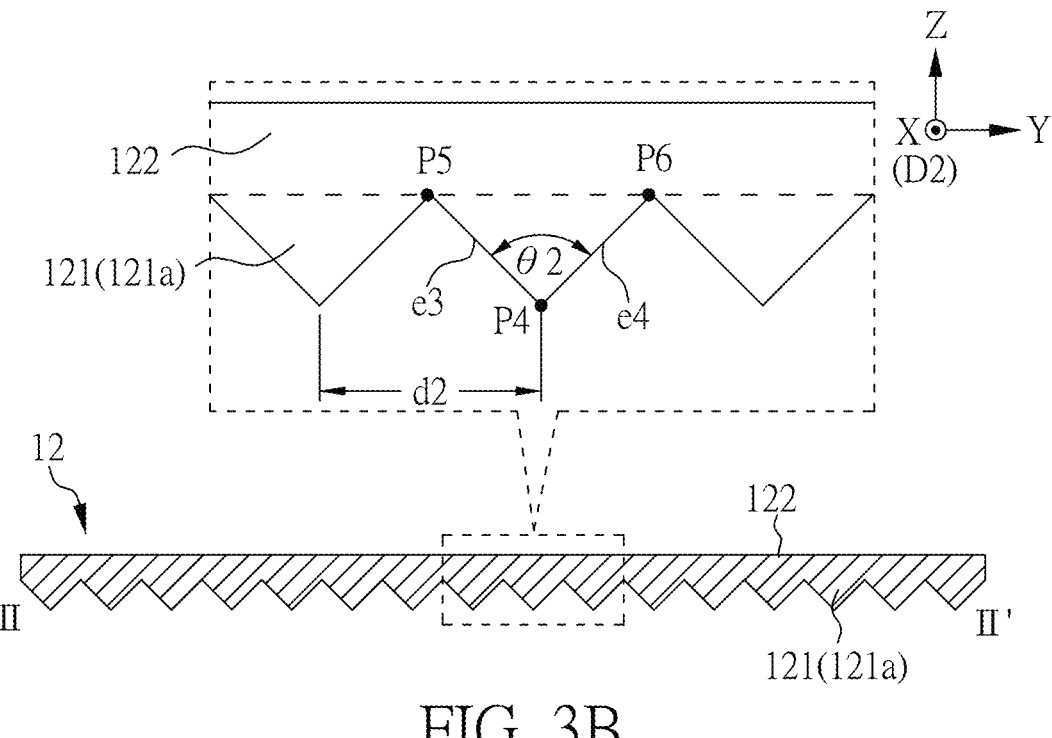
FIG. 3B is a cross-sectional view of the second optical film of FIG. 3A taken along line III-III'.
Figure 4A:
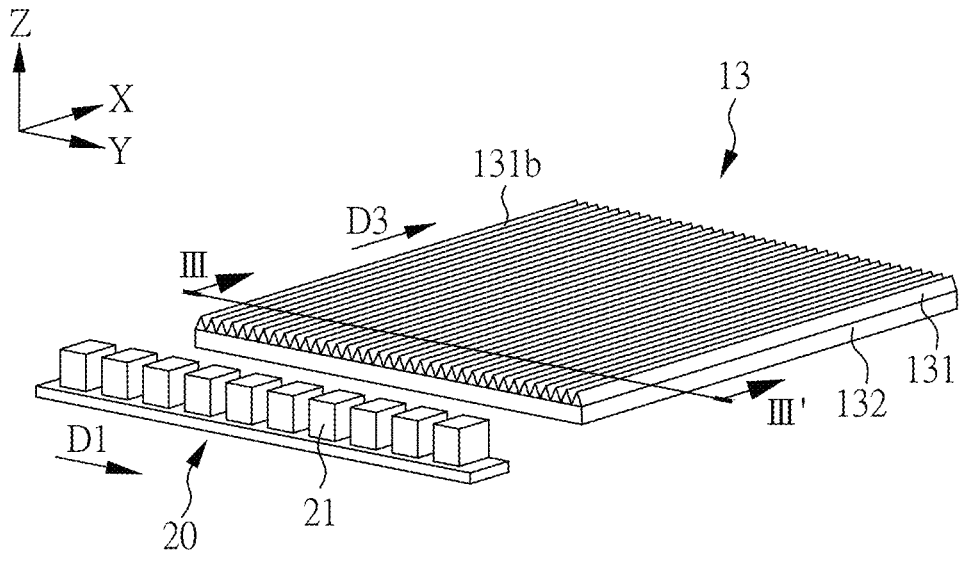
FIG. 4A is a schematic three-dimensional view of a third optical film according to an embodiment of the present disclosure.
Figure 4B:
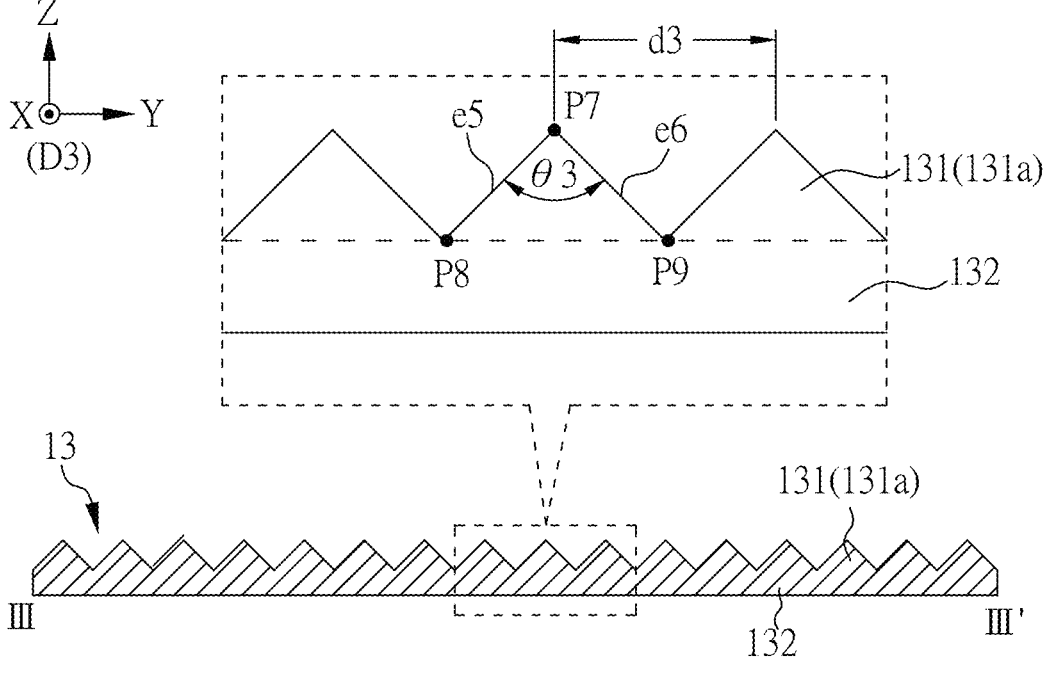
FIG. 4B is a cross-sectional view of the third optical film of FIG. 4A taken along line IV-IV'.

FIG. 2A is a schematic three-dimensional view of the first optical film according to an embodiment of the present disclosure. FIG. 2B is a cross-sectional view of the first optical film of FIG. 2A taken along line II-II'. FIG. 3A is a schematic three-dimensional view of a second optical film according to an embodiment of the present disclosure. FIG. 3B is a cross-sectional view of the second optical film of FIG. 3A taken along line III-III'. FIG. 4A is a schematic three-dimensional view of a third optical film according to an embodiment of the present disclosure. FIG. 4B is a cross-sectional view of the third optical film of FIG. 4A taken along line IV-IV'. It is noted that FIG. 2A, FIG. 3A or FIG. 4A only shows the light emitting component 20 and the first optical film 11, the second optical film 12 or the third optical film 13, and the light emitting component in FIG. 2A, FIG. 3A and FIG. 4A 20 is only used to describe the arrangement direction of the light emitting sub-units 21.

First, the first optical film 11 will be described. As shown in FIG. 2A, the extension direction of the first prism structure 111 of the first optical film 11 is the first direction D1, which is parallel or substantially parallel to the extension direction (Y) of the light emitting sub-units 21. More specifically, the "extension direction of the first prism structure 111" may be regarded as the extension direction of the first strip structure 111*a*. In one embodiment, the first optical film 11 may tolerate a deflection error within plus/minus 5 degrees during assembly. For example, when the first optical film 11 is assembled on the substrate 10, there may be an included angle between the first direction D1 and the extension directions (Y) of the light emitting sub-units 21, wherein the included angle is smaller than or equal to plus/minus 5 degrees, while it is not limited thereto.

As shown in FIG. 2B, in the cross-sectional view, each first strip structure 111*a* of the first prism structure 111 may include a plurality of edges e1, e2, wherein the two edges e1, e2 may intersect at a vertex P1 to for the first strip structure 111*a*, and the ends P2, P3 of the two edges e1, e2 may be respectively connected to other first strip structures 111*a*, but it is not limited thereto. In addition, each first strip structure 111*a* of the first prism structure 111 may have a first prism angle θ1, and the "first prism angle θ1" may be, for example, the included angle between the two edges e1, e2. In one embodiment, the first strip structure 111*a* may be, for example, an isosceles triangle (however, in other embodiments, it may also be any suitable shape with an included angle). In this case, the two edges e1, e2 have the same length, and the first prism angle θ1 may be regarded as the vertex angle of an isosceles triangle, but it is not limited thereto. In one embodiment, the first prism angle θ1 may be between 30 degrees and 110 degrees (that is, $30° \leq θ1 \leq 110°$), but it is not limited thereto. In one embodiment, the first prism angle θ1 may be between 40 degrees and 100 degrees (that is, $40° \leq θ1 \leq 100°$, but it is not limited thereto. In one embodiment, the first prism angle θ1 may be between 50 degrees and 90 degrees (that is, $50° \leq θ1 \leq 90°$), but it is not limited thereto.

In addition, as shown in FIG. 2B, in the arrangement direction (for example, X direction) of the plurality of first strip structures 111*a*, there may be a first distance d1 between the vertices P1 of two adjacent ones of the plurality of first strip structures 111*a*. In one embodiment, the first distance d1 may be between 10 micrometers and 30 micrometers (that is, $10 \, \mu m \leq d1 \leq 30 \, \mu m$), but it is not limited thereto. In one embodiment, the first distance d1 may be between 15 micrometers and 20 micrometers (that is, $15 \, \mu m \leq d1 \leq 20 \, \mu m$), but it is not limited thereto. In one embodiment, the first distance d1 may be between 17 micrometers and 19 micrometers (that is, $17 \, \mu m \leq d1 \leq 19 \, \mu m$), for example, 18 micrometers, but it is not limited thereto.

Figures 5, 6:
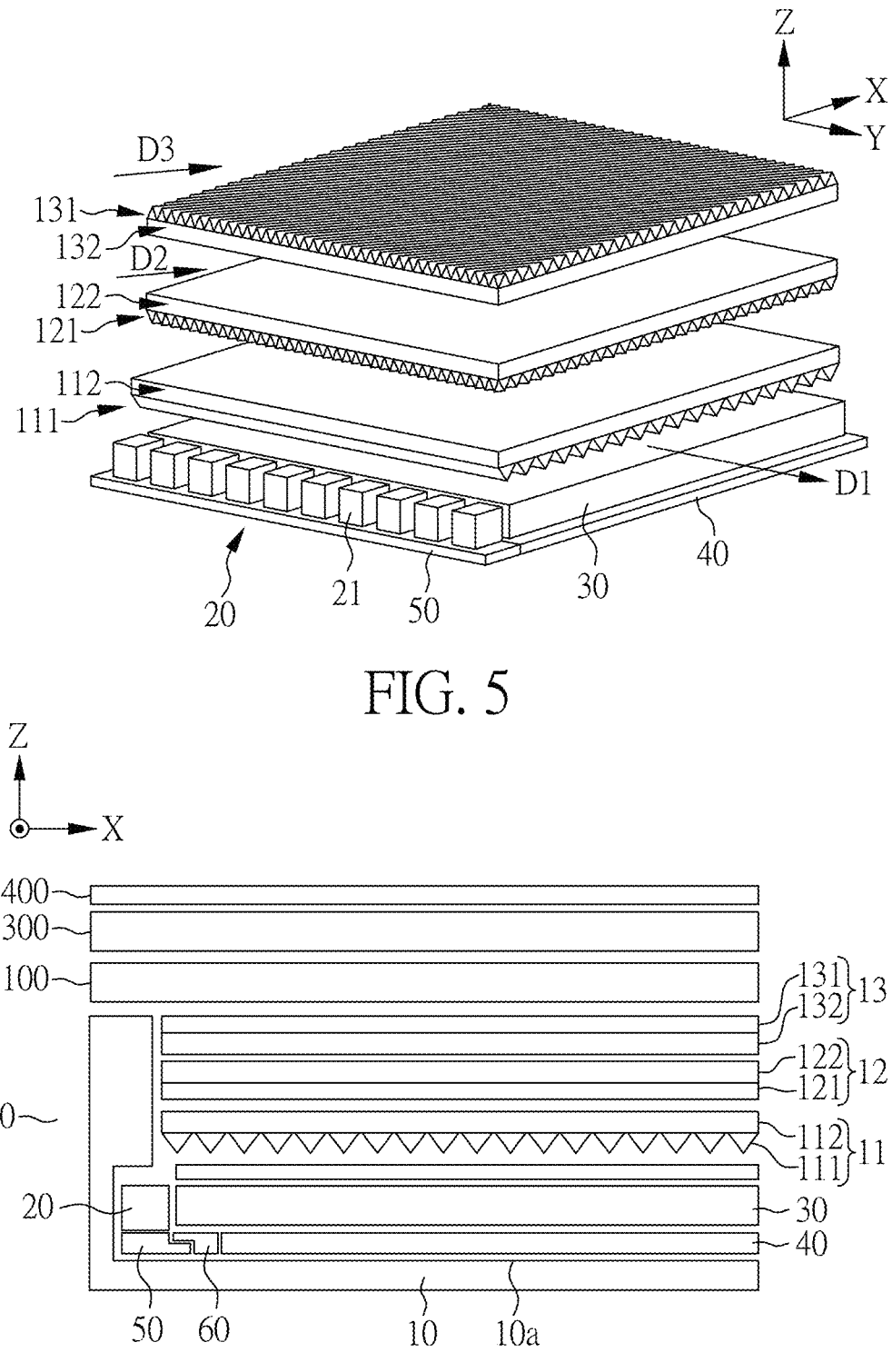
FIG. 5 is a perspective view of a display device according to another embodiment of the present disclosure.
FIG. 6 is a cross-sectional view of a display device according to another embodiment of the present disclosure.

Next, the second optical film 12 will be described. As shown in FIG. 3A, in one embodiment, the extension direction of the light emitting sub-units 21 is substantially parallel to the first direction D1, the extension direction of the second prism structure 121 of the second optical film 12 is the second direction D2, and there may be an included angle θ12 between the second direction D2 and the first direction D1 (shown in FIG. 1B). In the embodiment of FIG. 3A, the included angle θ12 is, for example, 90 degrees, but it may also be other angles (as shown in FIG. 5). More specifically, the "extension direction of the second prism structure 121" may be regarded as the extension direction of the second strip structure 121a. In one embodiment, the second optical film 12 may tolerate a deflection error within plus/minus 10 degrees during assembly, but it is not limited thereto.

As shown in FIG. 3B, in the cross-sectional view, each second strip structure 121a of the second prism structure 121 may include a plurality of edges e3, e4, wherein the two edges e3, e4 may intersect at a vertex P4 to form the second strip structure 121a, and the ends P5, P6 of the two edges e3, e4 may be respectively connected to other second strip structures 121a, but it is not limited thereto. In addition, each second strip structure 121a of the second prism structure 121 may have a second prism angle θ2, and the "second prism angle θ2" may be, for example, the included angle between the two edges e3, e4. In one embodiment, the second strip structure 121a may be, for example, an isosceles triangle (however, in other embodiments, it may also be any suitable shape with an included angle). In this case, the two edges e3, e4 have the same length, and the second prism angle θ2 may be regarded as the vertex angle of an isosceles triangle, but it is not limited thereto. In one embodiment, the second prism angle θ2 may be between 30 degrees and 140 degrees (that is, $30° \le θ2 \le 140°$, but it is not limited thereto. In one embodiment, the second prism angle θ2 may be between 40 degrees and 130 degrees (that is, $40° \le θ2 \le 130°$, but it is not limited thereto. In one embodiment, the second prism angle θ2 may be between 50 degrees and 120 degrees (that is, $50° \le θ2 \le 120°$, but it is not limited thereto.

In addition, as shown in FIG. 3B, in a horizontal direction (for example, Y direction), there may be a second distance d2 between the vertices P4 of two adjacent ones of the plurality of second strip structures 121a. In one embodiment, the second distance d2 may be between 40 micrometers and 60 micrometers (that is, 40 μm≤d2≤60 μm), but it is not limited thereto. In one embodiment, the second distance d2 may be between 45 micrometers and 55 micrometers (that is, 45 μm≤d2≤55 μm), but it is not limited thereto. In one embodiment, the second distance d2 may be between 47.5 micrometers and 52.5 micrometers (that is, 47.5 μm≤d2≤52.5 μm), for example, 50 micrometers, but it is not limited thereto.

Next, the third optical film 13 will be described. As shown in FIG. 4A, in one embodiment, the extension direction of the light emitting sub-units 21 is substantially parallel to the first direction D1, the extension direction of the third prism structure 131 of the third optical film 13 is the third direction D3, and there may be an included angle between the third direction D3 and the first direction D1 (not shown), while the included angle may be substantially the same as the included angle θ12 between the second direction D2 and the first direction D1 (shown in FIG. 1B), but it is not limited thereto. In the embodiment of FIG. 3A, the included angle is, for example, 90 degrees, but it is not limited thereto. More specifically, the "extension direction of the third prism structure 131" may be regarded as the extension direction of the third strip structure 131a. In one embodiment, the third optical film 13 may tolerate a deflection error within plus/minus 10 degrees during assembly, but it is not limited thereto.

As shown in FIG. 4B, in the cross-sectional view, each third strip structure 131a of the third prism structure 131 may include a plurality of edges e5, e6, wherein the two edges e5, e6 may intersect at a vertex P7 to form the third strip structure 131a, and the ends P8, P9 of the two edges e5, e6 may be respectively connected to other third strip structures 131a, but it is not limited thereto. In addition, each third prism structure 131a of the third prism structure 131 may have a third prism angle θ3, and the "third prism angle θ3" may be, for example, the included angle between the two edges e5, e6. In one embodiment, the third strip structure 131a may be, for example, an isosceles triangle (however, in other embodiments, it may also be any suitable shape with an included angle). In this case, the two edges e5, e6 have the same length, and the third prism angle θ3 may be regarded as the vertex angle of an isosceles triangle, but it is not limited thereto. In one embodiment, the third prism angle θ3 may be between 30 degrees and 140 degrees (that is, $30° \le θ3 \le 140°$, but it is not limited thereto. In one embodiment, the third prism angle θ3 may be between 40 degrees and 130 degrees (that is, $40° \le θ3 \le 130°$, but it is not limited thereto. In one embodiment, the third prism angle θ3 may be between 50 degrees and 120 degrees (that is, $50° \le θ3 \le 120°$, but it is not limited thereto.

As shown in FIG. 4B, in the horizontal direction (for example, Y direction), there may be a third distance d3 between the vertices P7 of two adjacent ones of the plurality of third strip structures 131a. In one embodiment, the third distance d3 may be between 20 micrometers and 28 micrometers (that is, 20 μm≤d3≤28 μm), but it is not limited thereto. In one embodiment, the third distance d3 may be between 22.5 micrometers and 26.5 micrometers (that is, 22.5 μm≤d3≤26.5 μm), but it is not limited thereto. In one embodiment, the third distance d3 may be between 23 micrometers and 25 micrometers (that is, 23 μm≤d3≤25 μm), for example, 24 micrometers, but it is not limited thereto.

Please refer to FIG. 2B, FIG. 3B and FIG. 4B again.

In one embodiment, the second prism angle θ2 or the third prism angle θ3 may be greater than the first prism angle θ1 (that is, θ1<θ2, or θ1<θ3), while it is not limited thereto. With such a design, it is advantageous in including, for example, concentrating light toward the front viewing angle or improving the contrast of the display device 1, while it is not limited thereto.

In one embodiment, the second distance d2 may be greater than the third distance d3, and the third distance d3 may be greater than the first distance d1 (that is, d1<d3<d2), but it is not limited thereto. With such a design, it is advantageous in including, for example, concentrating light toward the front viewing angle or improving the contrast of the display device 1, while it is not limited thereto.

In one embodiment, the refractive index n1 of the first optical film 11, the refractive index n2 of the second optical film 12, or the refractive index n3 of the third optical film 13 may be between 1.5 and 1.7 (that is, 1.5≤n1≤1.7, or 1.5≤n2≤1.7, or 1.5≤n3≤1.7). In the present disclosure, the first optical film 11, the second optical film 12 and the third optical film 13 may be prepared using the same or different materials. Therefore, the refractive index n1, the refractive index n2 and the refractive index n3 may be the same or different. In one embodiment, the refractive index n3 of the third optical film 13 may be greater than the refractive index n2 of the second optical film 12 (that is, n2<n3). With such a design, it is advantageous in including, for example, allowing light to be concentrated toward the front viewing angle or improving the contrast of the display device 1, but it is not limited thereto.

In one embodiment, in the horizontal direction (Y), the positions of the vertex P4 of the second strip structure 121a of the second prism structure 121 and the vertex P7 of the third strip structure 131a of the third prism structure 131 may correspond to each other (for example, the vertex P4 and the vertex P7 may be aligned with each other) or not correspond to each other (for example, the vertex P4 and the vertex P7 may not need to be aligned), but it is not limited thereto.

In one embodiment, the materials of the first optical film 11, the second optical film 12 and the third optical film 13 may include transparent materials, but not limited thereto. In one embodiment, the first optical film 11, the second optical film 12 and the third optical film 13 may include bottom plates (such as a first bottom plate 112, a second bottom plate 122 and a third bottom plate 132) and corresponding prism structures (for example, the first frame structure 111, the second frame structure 121 and the third frame structure 131). The materials of the aforementioned bottom plates or prism structures may include polycarbonate (PC), polyimide (PI), polyethylene terephthalate (PET), polyether polyol (POP), polymethylmethacrylate (PMMA), cycloolefin polymer (COP), rubber, glass, other suitable materials or a combination thereof, while it is not limited thereto. In one embodiment, the material of the aforementioned prism structure may include photo-curing glue, heat-curing glue, photo-thermal curing glue, moisture-curing glue, other suitable materials or a combinations thereof, while it is not limited thereto. In one embodiment, the material of the aforementioned phosphorus structure may include optical clear adhesive (OCA), optical clear resin (OCR), acrylic resin, other suitable materials, or a combination thereof, but it is not limited thereto.

Through the above design, in one embodiment, the side lobe of the backlight device 200 may be between 0.1% and 10% (that is, 0.1%≤side lobe≤10%), while it is not limited thereto. In one embodiment, the side lobe of the backlight device 200 may be between 0.1% and 5% (that is, 0.1%≤side lobe≤5%), while it is not limited thereto. In one embodiment, the side lobe of the backlight device 200 may be between 0.1% and 3% (that is, 0.1%≤side lobe≤3%), while it is not limited thereto. In one embodiment, the side lobe of the backlight device 200 may be between 0.1% and 1% (that is, 0.1%≤side lobe≤1%), while it is not limited thereto. Here, the "side lobe" may, for example, refer to the light intensity perceived by the user on a horizontal cross-section (for example, a side cross-section) of the display device 1 in the viewing angle direction, but it is not limited thereto.

In one embodiment, the side lobe of the backlight device 200 may be expressed as:

$$\text{side lobe} = (\text{Max}) \% - (45D) \%,$$

wherein Max is the maximum side lobe position, which is disposed in the range of approximately 45 degrees to 90 degrees from the center of the horizontal section of the display device 1 when the user's viewing angle direction deviates, 45D represents a position where the user's viewing angle deviates approximately 45 degrees from the center of the horizontal section of the display device 1, (Max) % is the light intensity at the position of maximum side lobe, and (45D) % represents the light intensity at a position where the side viewing direction deviates from the center viewing direction by approximately 45 degrees, while it is not limited thereto.

As a result, it can be seen that the present disclosure may significantly reduce the side light leakage problem of the backlight device 200. Therefore, the present disclosure is able to achieve privacy requirements or reducing side lobe without the need to additionally attach or arrange a privacy film or without using a backlight module with low yield and/or high cost.

The display device 200 of the present disclosure may have different implementation aspects. FIG. 5 is a perspective view of a display device according to another embodiment of the present disclosure, and please also refer to FIG. 1A.

In FIG. 1A, the extension direction of the second prism structure 121 (that is, the second direction D2) or the extension direction of the third prism structure 131 (that is, the third direction D3) is perpendicular to the extension direction of the first prism structure 111 (that is, the first direction D1). However, in FIG. 5, the second direction D2 or the third direction D3 is not perpendicular to the first direction D1, and the second direction D2 and the third direction D3 may be substantially parallel. In other words, in FIG. 5, the first direction D1 is parallel to the Y direction, while the second direction D2 and the third direction D3 are different from the X direction and the Y direction.

The display device 1 of the present disclosure may also have different implementation aspects. FIG. 6 is a cross-sectional view of a display device according to another embodiment of the present disclosure, and please also refer to FIG. 1B.

In comparison with the embodiment of FIG. 1B, the display device 1 of the embodiment of FIG. 6 further includes a viewing angle control panel 300. The viewing angle control panel 300 may be disposed on the display panel 100 in the normal direction (Z) of the substrate 10. In one embodiment, when a driving voltage is provided to the viewing angle control panel 300, the liquid crystal molecules in the viewing angle control panel 300 may rotate to achieve the effect of limiting the light angle, so that the display device 1 forms a privacy mode. When no driving voltage is applied to the viewing angle control panel 300, the liquid crystal molecules in the viewing angle control panel 300 are not activated, so that the display device 1 may form a sharing mode, but it is not limited thereto.

Furthermore, in one embodiment, the display device 1 may further include a touch unit 400. In one embodiment, the touch unit 400 may be disposed on the viewing angle control panel 300 in the normal direction (Z) of the substrate 10. The touch unit 400 may be, for example, a touch panel, which may be implemented through TOD (touch on display) or projected capacitive touch panel (sensor glass) technology, while it is not limited thereto. In another embodiment, the touch unit 400 may be disposed in the viewing angle control panel 300 or the display panel 100, which may be implemented through TID (touch in display) technology, but it is not limited thereto.

In one embodiment, in the present disclosure, by at least comparing a product through mechanism observation, such as the presence or absence of components or the operational relationship between components, as evidence, it is able to determine whether the product falls within the patent protection scope of the present disclosure, but it is not limited thereto. In one embodiment, the mechanism observation may be achieved, for example, by using equipment such as an optical microscope or a scanning microscope, but it is not limited thereto.

Details or features of various embodiments of the present disclosure may be mixed and matched as long as they do not violate the spirit of the present disclosure or conflict with each other.

The display device 1 and the backlight device 200 of the present disclosure can be understood. Therefore, the display device 1 of the present disclosure may provide a high contrast effect. Alternatively, the light emitted by the backlight device 200 may be concentrated toward the front viewing angle, thereby achieving privacy requirements without requiring additional attachment or installation of a privacy film, or making the yield rate of the backlight module higher and/or lower cost, or reducing the side lobe. Alternatively, the display device 1 of the present disclosure has high light package stability.

The aforementioned specific embodiments should be construed as merely illustrative, and not limiting the rest of the present disclosure in any way.

The invention claimed is:

1. A backlight device, comprising:
a substrate;
a light emitting component disposed on the substrate for providing a light source;
a first optical film disposed on the substrate and provided with a first prism structure extending along a first direction;
a second optical film disposed on the first optical film and provided with a second prism structure extending along a second direction; and
a third optical film disposed on the second optical film and provided with a third prism structure extending along a third direction,
wherein an included angle between the first direction and the second direction is between 30 degrees and 150 degrees, and the second direction is parallel to the third direction;
wherein the first prism structure has a plurality of first strip structures and there is a distance between two adjacent ones of the plurality of first strip structures, the second prism structure has a plurality of second strip structures and there is a second distance between two adjacent ones of the plurality of second strip structures, and the third prism structure has a plurality of third strip structures and there is a third distance between two adjacent ones of the plurality of third strip structures, where the second distance is greater than the third distance, and the third distance is greater than the first distance.

2. The backlight device as claimed in claim 1, wherein, in a normal direction of the substrate, the first prism structure and the second prism structure face same direction, the third prism structure and the second prism structure face opposite directions, and the first prism structure faces the substrate.

3. The backlight device as claimed in claim 1, further comprising a light guide component disposed adjacent to the light emitting component.

4. The backlight device as claimed in claim 3, further comprising a reflective component disposed between the substrate the light guide component in a normal direction of the substrate.

5. The backlight device as claimed in claim 3, wherein the light guide component is disposed on the substrate, and the light emitting component is disposed on one side of a light incident surface of the light guide component.

6. The backlight device as claimed in claim 1, wherein the first prism structure has a first prism angle, the second prism structure has a second prism angle, and the third prism structure has a third prism angle, where the first prism angle is between 50 degrees and 90 degrees, and the second prism angle or the third prism angle is between 50 degrees and 120 degrees.

7. The backlight device as claimed in claim 1, wherein the first optical film, the second optical film and the third optical film are in contact with each other.

8. The backlight device as claimed in claim 1, wherein a refractive index of the first optical film, the second optical film or the third optical film is between 1.5 and 1.7.

9. The backlight device as claimed in claim 8, wherein a refractive index of the third optical film is greater than a refractive index of the second optical film.

10. The backlight device as claimed in claim 1, wherein the first prism structure has a first bottom plate disposed thereon the plurality of first strip structures, the second prism structure has a second bottom plate disposed thereon the plurality of second strip structures, the third prism structure has a third bottom plate 132 disposed thereon the plurality of third strip structures.

11. The backlight device as claimed in claim 1, wherein the light emitting component includes a plurality of light emitting sub-units arranged along a direction parallel to the first direction.

12. The backlight device as claimed in claim 1, further comprising a circuit board disposed on a plane of the substrate; and a glue material disposed between the light emitting component and the substrate, wherein the light emitting component is disposed on the circuit board.

13. The backlight device as claimed in claim 1, wherein the first distance is between 15 micrometers and 20 micrometers, the second distance is between 40 micrometers and 60 micrometers, and the third distance is between 20 micrometers and 28 micrometers.

14. The backlight device as claimed in claim 1, wherein each of the first strip structure, the second strip structure and the third strip structure is an isosceles triangle.

15. The backlight device as claimed in claim 1, wherein the second direction or the third direction is perpendicular to the first direction.

16. A display device, comprising:
a backlight device, including;
a substrate;
a light emitting component disposed on the substrate for providing a light source;
a first optical film disposed on the substrate and provided with a first prism structure extending along a first direction;
a second optical film disposed on the first optical film and provided with a second prism structure extending along a second direction; and
a third optical film disposed on the second optical film and provided with a third prism structure extending along a third direction, wherein an included angle between the first direction and the second direction is between 30 degrees and 150 degrees, and the second direction is parallel to the third direction; and
a display panel disposed on the backlight device;
wherein the first prism structure has a plurality of first strip structures and there is a distance between two adjacent ones of the plurality of first strip structures, the second prism structure has a plurality of second strip structures and there is a second distance between two adjacent ones of the plurality of second strip structures, and the third prism structure has a plurality of third strip structures and there is a third distance between two adjacent ones of the plurality of third strip structures, where the second distance is greater than the third distance, and the third distance is greater than the first distance.

17. The display device as claimed in claim 16, further comprising a viewing angle control panel disposed on the display panel.

18. The display device as claimed in claim 17, further comprising a touch unit disposed on the viewing angle control panel.

19. The display device as claimed in claim 16, wherein, in a normal direction of the substrate, the first prism structure and the second prism structure face same direction, the third prism structure and the second prism structure face opposite directions, and the first prism structure faces the substrate.

\* \* \* \* \*